United States Patent [19]

Masuda

[11] 4,328,039
[45] May 4, 1982

[54] HIGH SULPHATE SLAG CEMENT AND METHOD FOR MANUFACTURING THIS CEMENT

[76] Inventor: Yoshitaka Masuda, 54, Koro, Kodera-cho, Kanzaki-gun, Hyogo Prefecture, Japan, 679-21

[21] Appl. No.: 138,220

[22] Filed: Apr. 7, 1980

[51] Int. Cl.³ .............................................. C04B 7/02
[52] U.S. Cl. .................................... 106/103; 106/117
[58] Field of Search ................ 106/103, 315, 117, 90, 106/109

[56] References Cited

U.S. PATENT DOCUMENTS

| | | | |
|---|---|---|---|
| 1,004,380 | 9/1911 | Daher | 106/103 |
| 2,848,340 | 8/1958 | Haldas | 106/315 |
| 3,188,221 | 6/1965 | Matsuda et al. | 106/315 |
| 3,351,478 | 11/1967 | Dodson et al. | 106/315 |

FOREIGN PATENT DOCUMENTS

| | | | |
|---|---|---|---|
| 546628 | 7/1942 | United Kingdom | 106/103 |
| 546629 | 7/1942 | United Kingdom | 106/103 |

*Primary Examiner*—James Poer

[57] ABSTRACT

A cement composition containing water-granulated slag, Portland cement, an organic carboxylic acid, a high molecular weight compound and sodium sulfate.

7 Claims, No Drawings

HIGH SULPHATE SLAG CEMENT AND METHOD FOR MANUFACTURING THIS CEMENT

BACKGROUND OF THE INVENTION

It is a matter of common knowledge that water-granulated blast furnace slag has a tendency to harden because the effects of hydration. Utilizing this property, this type of slag is mixed with Portland cement clinkers and pulverized to make low cost blast furnace slag and steel-making slag cement. However, in such cases, water-granulated slag by itself required relatively long periods of time to harden and does not acquire sufficient strength so that such slag tends to be used as an extender for Portland cement and the slag contents of such cements tend to be around 30% or less.

In addition to the type of slag cements referred to above, there is another well-known type of high sulphate slag cement known as the Sealithor variety, but it is not possible to make such a cement in quantity in Japan since suitable water-granulated blast furnace slag cannot be obtained, coagulation and hardening of such cements require relatively long periods of time and the surfaces of such cements, when hardened tend to develop weak areas so that such cements are, in actual practice, not widely used.

DETAILED DESCRIPTION OF THE INVENTION

This invention relates to slag cement and its manufacture, or stated more specifically special high sulphate slag cements and methods used in their manufacture.

This invention consists of a new type of high sulphate blast furnace slag which hardens rapidly and does not develop weak surface areas, and the methods used to make such a type of cement.

High sulphate slag cements known up to the present time, as represented by the Sealithor variety, not only require water-granulated slags not readily available in Japan but do not begin to coagulate for approximately five hours and the coagulation stage does not end for approximately ten hours. Hardening requires relatively long periods of time and hardening of the surface areas is unsatisfactory with weak areas frequently developing.

The invention which is the subject of this patent application consists of a high sulphate slag cement for practical use. This cement begins to coagulate in 1–3 hours. Coagulation ends after 4–6 hours of time have elapsed. Weak surface areas do not develop so that forms with sharp angles can be cast.

The cement which is the subject of this patent application is a powdered mixture with a Blaine specific surface ratio of 4500–5500 cm$^2$/g and consisting of water-granulated slag in the amount of 80–85% (such slag, containing CaO (40–50%), Al$_2$O$_3$ (14–20%), SiO$_2$ (30–35%), MgO (5–8%)) or, preferably 82–85%, plus CaSO$_4$ (13–17%), Portland cement (1.5–2.5%), organic carboxylic acid or alkali metal salts (0.1–0.5%), water-soluble higher molecular weight compounds (0.03–0.6%) and sodium sulphate (0.6–2%).

The method of manufacturing this cement consists of pulverizing and mixing blast furnace slag or blast furnace slag to which Al$_2$O$_3$ and/or CaO have been evenly added, mixed and which has then been reheated so that the slag particles recoalesce and then, which has been regranulated using water, in amount of 80–85% of the total (preferably 82–85%), with additional ingredients such as CaSO$_4$ (13–17%), Portland cement (1.5–2.5%), organic carboxylic acid or alkali metal salts (0.1–0.5%), water-soluble higher molecular weight compounds (0.03–0.6%) and sodium sulphate (0.6–2%) to produce a powdered mixture with a Blaine specific surface ratio of 4500–5500 cm$^2$/g.

In the manufacture of the high sulphate slag cement which is the subject of this patent application, the chemical structure of the slag is important. It is necessary to utilize slag which has high basicity and which contains CaO (40–50%), Al$_2$O$_3$ (14–20%), SiO$_2$ (30–35%) and MgO (5–8%). However, at the present time, slag which is readily available in Japan typically has such ingredients as CaO (40–43%), Al$_2$O$_3$ (14–16%), SiO$_2$ (30–35%), MgO (5–8%), TiO$_2$ (0.5%), S (1.0%) and FeO (0.2%). Thus, as a slag for making the slag cement which is the subject of this patent application, it barely satisfies the lower limit for required basicity. When basicity is low, the time required for hardening increases and strength decreases. Therefore, it is desirable to increase the basicity of such water-granulated blast furnace slag. However, this cannot be accomplished merely by adding Al$_2$O$_3$ and CaO and pulverizing them with the slag since this will have a negative effect on hardening time and strength.

Rather, the manufacturing process which is the subject of this patent utilizes a new method of obtaining slag of suitable characteristics, namely adding Al$_2$O$_3$ and/or CaO, mixing them with the slag particles, then heating and refusing the particles and regranulating the resulting slag by using water.

When slag of insufficient basicity is to be used to make the slag cement which is the subject of this patent, the use of the process described above, i.e., addition of Al$_2$ and/or CaO—mixing—heating to cause recoalescence of the slag particles—regranulation using water becomes a necessary part of the overall manufacturing process. Likewise, if slag of sufficient basicity is available, this portion of the overall process becomes unnecessary.

The amount of slag used to make the slag cement which is the subject of this patent is 80–85% of total weight, preferably 82–85%. The ingredient CaSO$_4$, i.e., gypsum, can be anhydride plaster of Paris or aqueous. Lime from anti-pollution devices aimed at removing SOx from stack gas can be used. The amount of CaSO$_4$ used (calculated as anhydride) is 13–17%. If CaSO$_4$.2-H$_2$O is used, the volume becomes 16–22%. The amount of Portland cement used is 1.5–2.5% (preferably 2.5%).

Examples of "organic carboxylic acids or alkali metal salts" would be sodium tartrate, citric acid, sodium citrate, etc. The amount used is 0.1–0.5%. These organic carboxylic acids or alkali metal salts works to speed coagulation and hardening.

Examples of "water soluble higher molecular weight compounds" are methyl-cellulose, sodium stearate in the metallic soap category or sodium lauryl benzenesulfonate. The amount used is 0.03–0.6%. In the case of the metallic soaps and methyl-cellulose, the amount used is 0.1–0.6%. For sodium benzenesulfonate, the amount is 0.03–0.06%. Overuse of sodium lauryl benzenesulfonate has the effect of slowing coagulation and hardening, but raises strength so that the amount used depends on the use of the final product.

Regarding the organic carboxylic acids and their alkali metal salts, and the higher molecular weight compounds mentioned above, one of each can be used or several types of each can be used in combination.

The amount of sodium sulphate used is 0.6-2%.

The high sulphate which is the subject of this patent application has a Blaine specific surface ratio of 4500-5500 cm$^2$/g is desirable. If the ratio is lower than 4500, the time required for hardening rises. In contrast, if the ratio is raised above 5500, the costs outweigh the benefits.

As a way of understanding the high sulphate slag cement manufacturing method described above, either water granulated blast furnace slag, or such slag to which $Al_2O_3$ and/or CaO has been added and mixed in, then heated so that the particles of slag have recoalesced and then have been regranulated, should be mixed with gypsum, Portland cement, organic carboxylic acid or its alkali metal salts, the stipulated water-soluble higher molecular weight compounds and sodium sulphate, in the proportions stated above and should be pulverized until the specified Blaine specific surface ratio is obtained or, rather the various ingredients, singly or in various combinations should be pulverized in the specified proportions and mixed together to obtain a mixture with the specified Blaine specific surface ratio.

The high sulphate slag cement described in this patent application, when compared to the well-known Sealithor cement, is noticeably better for its faster coagulation and hardening. The technical reasons for this are not sufficiently clear at the present time, but the inventor has offered the possible explanations below although the invention and its related claims are in no way bound by these possible explanations.

In way of possible explanation, it is thought that when the high sulphate slag cement which is the subject of this patent is mixed with a suitable amount of water, the dissociation of the organic carboxylic acids and alkali metal salts causes, directly or indirectly, the stimulation of a slag dissolving action based on $Na_2O$ and $K_2O$. The carboxylic acid also works to dissolve the gypsum. This causes the formation of $Ca(OH)_2$ which in turn causes the formation of a highly alkaline solution. The liquidation of the CaO and $Al_2O_3$ contained in the slag and the increased concentration of the $CaSO_4$ in solution cause an increase in the probability of molecular collision in the liquid phase which in turn hastens the reaction. This prevents the formation of a silica gel, containing $SiO_2$, which salts out, is dense and will not allow water to penetrate. Rather, a silica gel of rather coarse porous texture is formed which improves the penetration of water and aids the formation of ettringite ($3CaO.Al_2O_3.CaSO_4.32H_2O$) and calcium silicate hydrates. As the reaction progresses, the level concentration of the liquid phase $CaO.Al_2O_3.SO_4$ drops, and the formation of an alumina hydrate ($Al_2O_3.3H_2O$) takes place. This hydrate and the $SiO_2$ gel form particles of a crystalline nature on the surface of the slag particles. The ions cause the gel particles to align themselves in a net-like form which fills in the gaps in the ettringite and knit together. This series of reactions are speeded up based on the rapid hydrolysis of the solute caused by the catalytic action of the additives, because saturation at the liquid phase ceases. This causes, it is theorized, the more rapid beginning of coagulation and its more rapid completion.

Further, like the additive metallic soaps, methylcellulose and sodium lauryl benzenesulfonate, the higher molecular weight compounds dissolve and form a film on the surface of the hardening cement which cuts off its exposure to the surrounding air, thus preventing the formation of weak areas in the surface and stimulating the dispersion of the cement particles and causing a camping effect so that the density and strength of the cement are heightened.

As curing takes place, the structures of the hydrates become fixed and coalesce, giving the cement stability and the ability to resist water. Specific examples will be used below to provide a more specific explanation of the invention. These specific examples are intended for the purposes of explanation only and are intended in no way to limit the generality and validity of the claims as set forth in this patent. In addition, it should be noted that where percentages are referred to in this patent unless otherwise stipulated, they indicate percentage by weight.

EXAMPLE #1

Slag was obtained from Shin-Nihon Seitetsu's Hirohata mill. The composition was CaO (41.8%), $Al_2O_3$ (14%), $SiO_2$ (34%), MgO (7%), MnO (0.5%), $TiO_2$ (1.0%), S (1.0%), FeO (0.2%). This blast furnace slag, with an calcination loss of 0.5% and chemical structure basicity of 1.85, was pulverized to a Blaine specific surface ratio of 5000 cm$^2$/g using a pulverizer (carbon steel stainless alloy rod and ball) belonging to Chuo Kakoki K.K. (Toyotashi, Aichi Pref.). This pulverized slag came to 83% of the total by weight. To this was added calcinated gypsum (used for stack gas SOx removal) in the amount of 18% (13.8% converted to the anhydrous form).

The $CaSO_4.2H_2O$ contained had a purity rating of 96.4-97.8%. (This $CaSO_4$ solution had an overall chemical composition as follows: CaO (32.3-33%), $SO_3$ (44.8-45.5%), $H_2O$ (20.7-20.9%), $Fe_2O_3$ (0.05-0.12%), S (0.05-0.92%), $CO_2$ (0.41-0.82%), Cl (0.03-0.05%), $H_2SO_4$ (0.07%), water soluble alkalis (0.07-0.23%), MgO (0.01%), $Al_2O_3$ (0.01%)). In addition, the following substances were added: Portland cement (2%), citric acid (0.2%), metallic soap (0.1%), sodium sulphate (0.6%), methylcellulose (0.1%). The ingredients were well mixed together and a high sulphate slag cement was then made. Water was added and mixed with the cement to obtain a W/C ratio of 25% which was then poured into a mold. The surrounding air temperature was 10°-20° C. and the relative humidity was 78%. Coagulation began in approximately 1.5 hours and ended after a total elapsed time of 4.5 hours.

A film formed on the surface of the concrete form and devitrification occurred. The form was removed from the mold 24 hours later. Weak areas in its surfaces could not be detected. The upper surface was milk-white in appearance. The bottom surface had a blue-green hue. The form was placed in water for 27 days and when measured on the 28th day, no signs of swelling or shrinkage were noted. Compression strength testing produced the following results:

Day 3—378 kg/cm$^2$
Day 14—502 kg/cm$^2$

EXAMPLE #2

Slag of the type used in Example #1 (83%), calcinated gypsum (18%) and Portland cement (2%) were mixed together and then calcium stearate (0.45%), methyl-cellulose (0.1%), sodium tartrate (0.21%), sodium sulphate (0.6%) and potassium citrate ($K_3C_6H_5O_7.H_2O$, 0.2%) were added and all ingredients were mixed together. Then water (w/c 28%) was added and the resulting cement was mixed and poured into a mold. The surrounding temperature was 10–20% (and relative humidity was 78%). Coagulation began after 2 hours and ended after 5 hours. A film formed on the surface of the form and devitrification occurred. The form was removed from the mold after 24 hours. The bottom surface was green. The upper surface was greenish blue. The form was placed in water for 14 days. The bluish hue deepened and the surface become shiny. Neither swelling or shrinking in size could be detected and after drying the form by exposure to the surrounding air, no changes in appearance or physical size took place.

EXAMPLE #3

To slag (similar to that used above), $CaSO_4.2H_2O$ and Portland cement were added calcium stearate (0.3%), methyl-cellulose (0.3%), potassium citrate (0.21%) and sodium sulphate (0.6%). These ingredients were blended together and water was added (w/c 26%) and mixed with the ingredients. Then the cement was poured into a mold. The temperature was 10°–20° C. and the humidity was 78%. Coagulation began one hour and fifty minutes had elapsed and ended after five hours elapsed time. A film formed on the surface. No bridging water was present and devitrification occurred. The form was removed from the mold after 24 hours. The surface was milk-white in color, the bottom was spotted blue. No weak areas could be detected in the surface.

EXAMPLE #4

Slag similar to that used in Example #1, $CaSO_4.2H_2O$ and cement were blended together. To this mixture was added methyl-cellulose (0.3%), calcium stearate (0.2%), sodium sulphate (0.7%), potassium citrate (0.2%), and sodium lauryl benzenesulfonate (0.01%). All ingredients were blended together and then mixed with water (w/c 25%). The resulting cement was poured into a mold. The surrounding temperature was 20° C., humidity was 78%. Coagulation began after two hours and forty minutes and ended after five hours and twenty minutes. A film formed on the surface of the form and a small amount of bridging water was detected. After 24 hours, the form was removed from the mold. No weak areas were detected on the surface of the form. The corners were sharp and the surface was white, the bottom pale blue. After air-drying, the pale blue color faded, but hardening was good. After air drying for seven days and submergence in water for 28 days, no swelling, shrinking or cracking had occurred and corners remained sharp.

In addition to the four examples described above, an additional seven samples of similar chemical composition were made and similar results were obtained. For one sample, the amount of sodium lauryl benzenesulfonate was greatly increased and the percentage of water was also significantly increased. Hardening took longer, but sufficient strength was obtained.

To increase the basicity of the blast furnace slag CaO and $Al_2O_3$ used were added to slag of the type used in Example #1. The slag particles were heated and recoalesced, then regranulated by using water. In this manner, a slag was obtained that had a chemical composition as follows: CaO (45.01%), $Al_2O_3$ (18.28%), $SiO_2$ (29.87%), MgO (6.10%), MnO (0.25%), $TiO_2$ (0.4%), S (0.7%), $Fe_2O_3$ (0.1%), (ignition loss was not measured) and a basicity of 2.32. This slag (83%) was mixed with Portland cement (2%), $CaSO_4.2H_2O$ (19%, calculated as $CaSO_4$, 14.6%), methyl-cellulose (0.15%), calcium stearate (0.2), sodium sulphate (0.6%), and potassium citrate (0.1%) in a stainless steel drum and pulverized to obtain a Blaine specific surface ratio of 5000 $cm^2/g$. Then a suitable amount of water was mixed in and the resulting cement was poured into a mold. Hardening took place at 10°–20° C. and relative humidity of 78%. When the form was removed from the mold 24 hours later, no weak surface areas could be detected. The color was deep blue. After 27 days in water, in the 28th day no swelling, shrinking or cracking could be detected. Strength was measured at 600 $kg/cm^2$.

What is claimed is:

1. A high sulphate slag cement with a Blaine specific surface ratio of 4,500 to 5,500 $cm^2/g$ consisting of:
    a. Approximately 80–85% blast furnace water slag by weight which in turn contains 40–50% CaO, 14–20% $Al_2O_3$, 30–35% $SiO_2$, and 5–8% MgO;
    b. 13–17% $CaSO_4$ calculated as anhydrite;
    c. 1.5–2.5% Portland cement;
    d. 0.1–0.5% of at least one compound selected from the group of organic carboxylic acids or acid salts consisting of tartaric acid, sodium tartrate, potassium tartrate, citric acid, sodium citrate, potassium citrate;
    e. 0.03–0.6% of at least one water-soluble higher molecular weight compound selected from the group consisting of methyl-cellulose, sodium stearate and sodium lauryl benzenesulfonate; and
    f. 0.6–2% sodium sulfate.

2. The slag cement of claim 1, wherein the $CaSO_4$ is gypsum.

3. The slag cement of claim 1, wherein said 0.1–0.5% of at least one compound selected from the group of organic carboxylic acids and acid salts comprises an aggregate amount equalling 0.1–0.5% of two compounds selected from the group of organic carboxylic acids or acid salts consisting of tartaric acid, sodium tartrate, potassium tartrate, citric acid, sodium citrate, potassium citrate.

4. The slag cement of claim 1, wherein said 0.03–0.6% of at least one water-soluble higher molecular weight compound consists of an aggregate of two water-soluble higher molecular weight compounds selected from the group consisting of methyl-cellulose, sodium stearate and sodium lauryl benzenesulfonate.

5. The slag cement of claim 1 wherein said slag contains 2–2.5% Portland cement.

6. A method for making the slag cement of claim 1 comprising the steps of blending and mixing 80–85% water slag which in turn has a composition by weight of CaO (40–50%), $Al_1O_3$ (14–20%), $SiO_2$ (30–35%) and MgO (5–8%), together with 13–17% $CaSO_4$, 1.5–2.5% Portland cement and 0.1–0.5% of at least one compound selected from the group consisting of tartaric acid, sodium tartrate, potassium tartrate citric acid, sodium citrate, potassium citrate; together with 0.03–0.6% of at least one compound selected from the group consisting of methylcellulose, potassium stearate, sodium lauryl benzenesulfonate; and together with (0.6–2%) sodium sulfate to form a mixture; and reducing said mixture to powder form.

7. The slag cement of claim 1, wherein the $CaSO_4$ is anhydrite.

* * * * *